(12) United States Patent
DeAnda

(10) Patent No.: US 6,412,585 B1
(45) Date of Patent: Jul. 2, 2002

(54) STRUCTURE FOR AN AUTOMOBILE BODY AND CHASSIS

(76) Inventor: Daniel DeAnda, 332 Mary Jeanne, El Paso, TX (US) 79915

( * ) Notice: Subject to any disclaimer, the term of this patent is extended or adjusted under 35 U.S.C. 154(b) by 0 days.

(21) Appl. No.: 09/516,760

(22) Filed: Mar. 1, 2000

(51) Int. Cl.[7] .............................................. B60K 5/00
(52) U.S. Cl. .................. 180/291; 180/89.1; 296/190.01
(58) Field of Search ............................ 180/69.2, 69.24, 180/69.4, 291, 89.1, 89.17, 89.18, 89.19; 280/781, 783; 296/24.1, 64, 183, 190.01, 190.08, 190.1

(56) References Cited

U.S. PATENT DOCUMENTS

| | | | | |
|---|---|---|---|---|
| 2,370,237 A | * | 2/1945 | Essl | 180/69.2 |
| 2,781,102 A | * | 2/1957 | Prichard | 180/69.2 |
| 2,845,133 A | * | 7/1958 | Norrie et al. | 180/69.2 |
| 2,888,296 A | * | 5/1959 | Huggins | 296/24.1 |
| 2,963,074 A | * | 12/1960 | Woodard | 296/64 |
| 3,549,195 A | * | 12/1970 | Kallinikos | 296/24.1 |
| 3,770,312 A | * | 11/1973 | Shadburn | 296/190.1 |
| 6,070,689 A | * | 6/2000 | Tanaka et al. | 180/291 |

FOREIGN PATENT DOCUMENTS

| | | | | |
|---|---|---|---|---|
| FR | 574092 | * | 7/1924 | 180/69.2 |
| GB | 128551 | * | 8/1920 | 180/291 |

OTHER PUBLICATIONS

"The Autocar", pp. 7,–8, Jul. 1, 1955.*

* cited by examiner

Primary Examiner—Frank Vanaman

(57) ABSTRACT

The present invention overcomes the disadvantages of the prior art by providing an arrangement for an automobile body and chassis which has optimal weight distribution. The arrangement features a passenger compartment arranged beside the engine compartment, allowing for storage compartment in both the front and rear portions of the vehicle structure. An upward opening hood is positioned over the engine compartment. The hood is configured to roll into a central void between the engine compartment and the passenger compartment thereby allowing totally unrestricted access to the engine. In order to streamline the engine compartment and maximize the lateral displacement of the passenger compartment, the engine is either of the in-line or slant configuration. The seats contained in the passenger compartment are arranged from the front to the rear of the vehicle, with the driver's seat placed in front of the passenger's seat. An infant seat may be placed on the wall separating the engine compartment from the passenger compartment, adjacent either the passenger seat or the driver's seat.

2 Claims, 2 Drawing Sheets

STRUCTURE FOR AN AUTOMOBILE BODY AND CHASSIS

BACKGROUND OF THE INVENTION

The present invention relates generally to automotive vehicles. More particularly, it relates to an arrangement for an automobile body and chassis which is particularly adapted for use as a light truck.

Statement of the Prior Art

Many arrangements for passenger car and light truck (e.g. pickup truck) body and chassis components are known, and they fall generally into three broad categories. The first category features an engine mounted in the front portion of the vehicle and utilizes either front or rear wheel drive. The second category has a rear mounted engine and almost always has rear wheel drive. The third category has an engine mounted approximately in the middle of the car and may have rear wheel or all wheel drive. This particular layout is usually reserved for high performance sports cars do to its near perfect weight distribution. The overwhelming majority of automobiles on the road today fall into one of these three broad categories, with pickup trucks almost always having front engine layouts. While these arrangements are generally satisfactory for performing the basic function of transportation, there are some drawbacks to the front engine layout, especially as applied to a pickup truck.

The first drawback is that the weight distribution in a pickup truck is very heavily weighted towards the front of the vehicle. This weight distribution in combination with the high center of gravity inherent in such vehicles produces the handling characteristics which are predictably quite poor. Indeed, there are many devices available for lining the bed of a pickup truck so as to improve weight distribution and traction when the truck bed is empty.

The second drawback is that there is typically no covered storage space for a pickup truck. There are several ways to combat the storage problem, most of which compromise the utility of the open truck bed. For example, locking tool boxes have to be removed when a large load is to be transported. Truck bed covers are often inconvenient as they are not typically removable and do not allow for the loading of large bulky loads.

U.S. Pat. No. 5,372,399 issued to Ito et al. discloses a body structure for a vehicle. The engine is disposed beneath the seats, and access to the engine can only be gained by folding one of the seats along a fold line thereby opening an access hole provided in the vehicle body. While this arrangement does depart substantially from the prior art arrangements, it is not without its own drawbacks. First, the engine is accessible only through a single access hole making repairs of certain components extremely difficult and time consuming. Also, the access hole is directly under a passenger seat and serves to conduct heat to that area of the cabin. Finally, at least one of the seats must be removed in order to access and service the engine, forcing perhaps one or more passengers to leave the vehicle for servicing. By contrast, the present invention provides an alternative layout for an automotive vehicle, in particular a pickup truck. The engine is disposed on one side of the vehicle while the passenger compartment is on the opposite side of the vehicle. The drive train and other components may be shifted in order to adjust the weight distribution. Access to the engine is via an upward lifting lid which may optionally be configured to be disposable within a recess in the vehicle body.

U.S. Pat. No. 4,267,895 issued to Eggert, Jr. discloses another vehicle having a somewhat unconventional arrangement. The vehicle has both front and rear storage compartments. The rear portion of the body structure contains the engine, which is disposed over the wheel housings. The wheel housings are displaced from their optimal positions in order to accommodate the rear seats. The present invention contemplates a structure for a vehicle which may have front and rear storage compartments, but the engine is disposed on one side of the vehicle. The wheel housings are positioned as in the conventional arrangements in order to preserve symmetry and to maintain the best possible weight distribution.

None of the above inventions and patents, taken either singly or in combination, is seen to describe the instant invention as claimed.

SUMMARY OF THE INVENTION

The present invention overcomes the disadvantages of the prior art by providing an arrangement for an automobile body and chassis which has optimal weight distribution. The arrangement features a passenger compartment arranged beside the engine compartment, allowing for storage compartments in both the front and rear portions of the vehicle structure. A upward opening hood is positioned over the engine compartment, the hood being stowable within a recess in the vehicle body. In order to streamline the engine compartment and maximize the lateral displacement of the passenger compartment, the engine is either of the in-line, slant, or slant-V configuration. The seats contained in the passenger compartment are arranged from the front to the rear of the vehicle, with the driver's seat placed in front of the passenger's seat. An infant seat may be placed on the wall separating the engine compartment from the passenger compartment, adjacent either the passenger seat or the driver's seat.

Accordingly, it is a principal object of the invention to provide an arrangement for a pickup truck which has advantages over the conventional front engine rear drive configurations.

It is an object of the invention to provide an arrangement for an automobile body and chassis having a centrally located engine in order to improve weight distribution and handling characteristics.

It is another object of the invention to provide an arrangement for an automobile body where the engine accessibility is enhanced by a stow away hood mechanism.

It is another object of the invention to provide an arrangement for a pickup truck having more storage space than a conventional pickup truck of approximately the same wheelbase.

It is another object of the invention to provide an arrangement for an automobile body where the body has at least two access panels for accessing the engine compartment.

Finally, it is a general object of the invention to provide improved elements and arrangements thereof in an apparatus for the purposes described which is fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
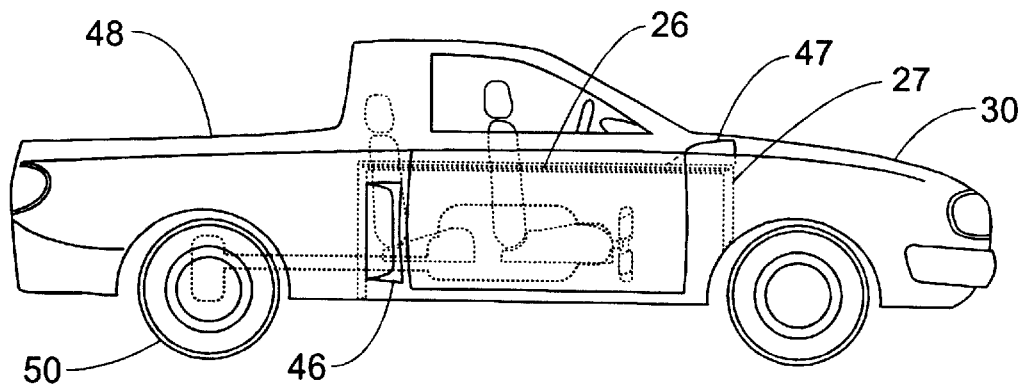
FIG. 1 shows a plan view, partly in section, of an automotive vehicle arranged in accordance with the structure of the present invention.
Figure 2:
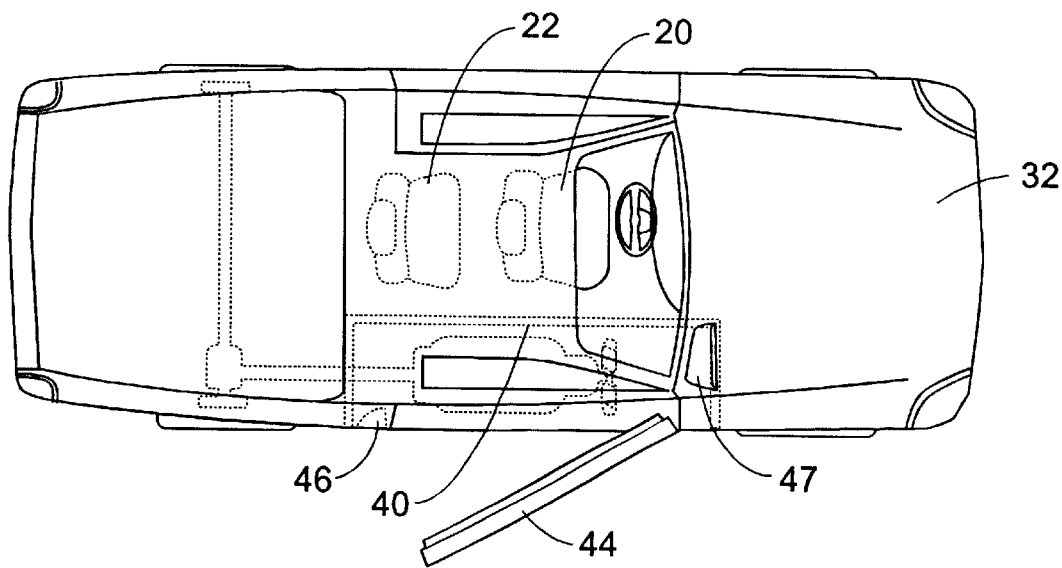
FIG. 2 shows a front view, partly in section, of the automotive vehicle illustrating the relation of the passenger compartment to the engine compartment.

Referring now to FIGS. 1–4, an automotive vehicle arranged in accordance with the concept of the present invention, generally indicated by the numeral 10, is shown. The vehicle 10, which may most advantageously be a pickup truck, features an engine compartment 12 arranged beside a passenger compartment 14. The engine compartment 12 is large enough to house a six or eight cylinder engine. Preferably, the engine 16 has a slant or in-line configuration to minimize lateral displacement. It can be readily appreciated that minimizing this lateral displacement allows for maximizing the width of the passenger compartment 14. The drive train 18 may be offset in order to achieve superior weight distribution, as may be the gas tank 19. In a preferred embodiment, the vehicle is a front wheel drive vehicle. The passenger compartment 14 has at least one seat 20 for the driver of the vehicle, and preferably includes at least one additional seat 22 arranged in line with the driver's seat 20. An infant seat (not shown) may be placed beside either the driver's seat 20 or the passenger seat 22. Thus the passengers are disposed one side of the vehicle 10, while the engine is on the opposite side, allowing for superior weight distribution.

Figure 3:
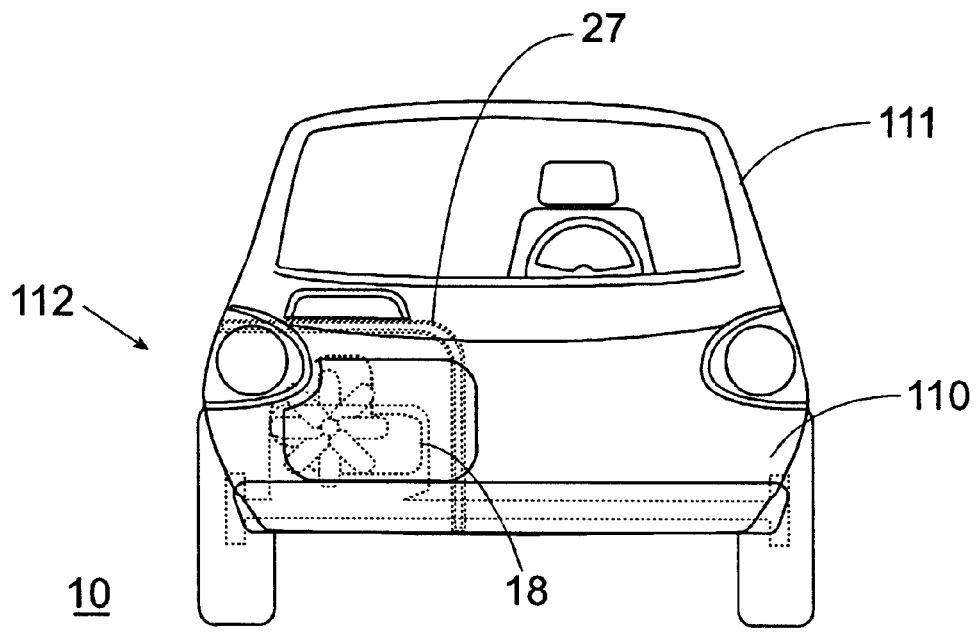
FIG. 3 shows a side sectional view detailing the movement of the hood panel.

The engine compartment 12 has an upward opening covering or hood assembly 26 which allows access to the engine 16. Accessibility to the engine 16 is greatly enhanced by having a fold away hood assembly 26. A mechanism similar to a fold away hard top used for convertibles may be employed. The mechanism would include a motor (not shown) for retracting the hood assembly 26 into a recess 27. Thus the engine 16 would be accessible from the top and sides, with the windshield 29 obstructing access only from the front. A lightweight removable covering 31 may be used to prevent heat or emissions from the engine 16 fouling the windshield 29. The covering 31 may be taken completely out of the vehicle 10 or hingedly attached to move between open and closed positions as shown in FIG. 3.

A first firewall 28 is situated between the passenger compartment 14 and the engine compartment 12, with a second firewall 30 situated between the forward portion of the engine compartment 12 and trunk 32. An additional partition 34 may extend between the passenger compartment 14 and the engine compartment 12, this additional partition 34 extending all the way to the interior side of the vehicle roof 38.

Access to the engine 16 may also be gained by an additional opening in the form a hingedly attached door 44. This forward opening door 44, in combination with the hood assembly 26, would allow direct access to the engine from three sides to facilitate servicing. A vent or exhaust port 46 may be formed in the door 44, or between the door 44 and the side panel. An air vent 47 is also provided at the front of the engine 16, thus cooling of the engine is facilitated since the air can flow from the front to the rear of the vehicle through the engine compartment. It can be appreciated that most engine designs do not allow such unrestricted airflow. The intake vent 47 and exhaust port 46 are in very close proximity both to each other and to the engine 16. One or both of vents 46 and 47 may be selectively closed in extremely cold weather to prevent excessive cooling of the engine. The size, shape, and exact position of the intake vent 47 and exhaust port 46 are variable to accomodate the various designs which may be achieved within the scope of the inventive concept.

A truck bed 48, having wheel housings 50 formed in opposing sides, extends from the rear of the passenger 14 and engine 12 compartments. In the event the vehicle 10 is to be a van or other passenger vehicle, the wheel housings 50 would be formed in approximately the same location of the rear portion of the vehicle 10. The interior space of the vehicle 10 could then be divided between additional passenger space and additional storage/trunk space.

Figure 4:
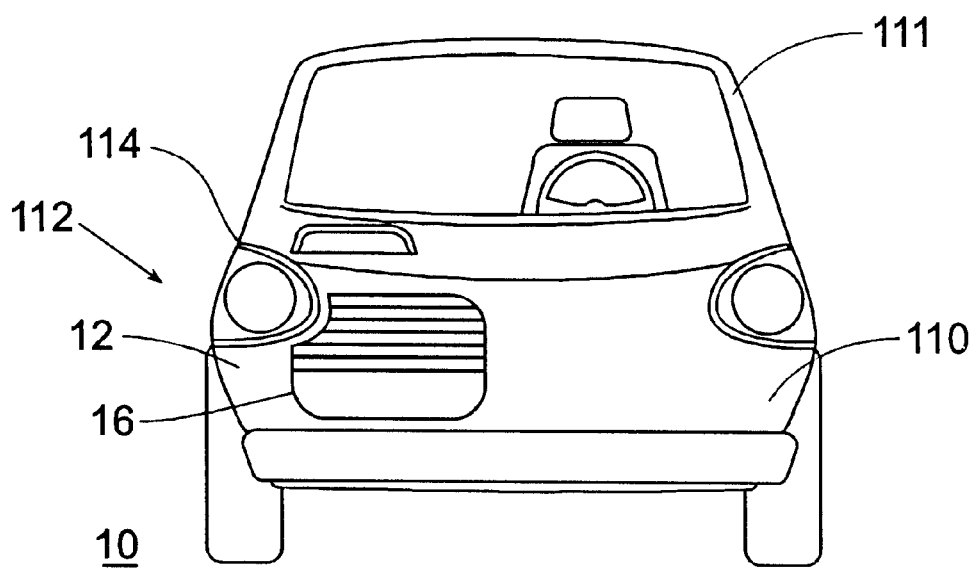
FIG. 4 shows a front view of an alternative embodiment of the automotive vehicle of FIG. 1, the embodiment incorporating additional structural elements.

An alternative embodiment of the vehicle is shown in FIG. 4, generally identified by the numeral 100. In this embodiment, the vehicle 100 has a passenger compartment 110 only on one side of the vehicle as in the previous embodiment, however the cab 111 covers only the passenger compartment 110. Thus the space above the engine 112 is open allowing even greater engine 112 access than the previous embodiment. As in the previous embodiment, a door may be provided in the side panel 116 in order to improve access to the engine.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims.

What is claimed is:

1. A structure for a vehicle-comprising:
 a body portion having a front end and a rear end, a left side and a right side;
 a cavity formed within said body portion extending from said front end to a transverse wall extending from said right side to said left side;
 a cab formed in a central region of said body portion extending approximately from said transverse wall at its front end to a forward end of a truck bed, said truck bed formed at a rear region of said body portion, said cab having a generally hollow interior with a longitudinal wall approximately co-extensive with said cab formed within said hollow interior, said longitudinal wall serving to divide said cab into an engine compartment and a passenger compartment;
 said engine compartment having an engine disposed therein and said passenger compartment having at least one seat disposed therein;
 a roof disposed above said cab and extending over said engine compartment and said passenger compartment;
 opposing outer sidewalls extending downwardly from said roof, both of said sidewalls having doors formed therein, one of said doors allowing access to said passenger compartment and the other of said doors allowing access to said engine compartment.

2. The vehicle of claim 1 wherein said door allowing access to said engine compartment has an exhaust vent formed therein.

* * * * *